United States Patent [19]

Bowers

[11] 4,120,012
[45] Oct. 10, 1978

[54] DISKETTE DOOR

[75] Inventor: George W. Bowers, Hayward, Calif.

[73] Assignee: Information Terminals Corporation, Sunnyvale, Calif.

[21] Appl. No.: 788,286

[22] Filed: Apr. 18, 1977

[51] Int. Cl.$^2$ ................ G11B 23/02; B65D 85/30
[52] U.S. Cl. .................................. 360/133; 206/444
[58] Field of Search ............... 360/133, 97–99; 206/444

[56] References Cited

U.S. PATENT DOCUMENTS

| 3,529,301 | 9/1970 | Hiruta | 360/133 |
| 3,609,722 | 9/1971 | Zenzefellis | 360/133 |
| 3,864,755 | 2/1975 | Hargis | 360/133 |

Primary Examiner—Robert S. Tupper
Attorney, Agent, or Firm—Lindenberg, Freilich, Hornbaker, Wasserman, Rosen & Fernandez

[57] ABSTRACT

Magnetic recording media called diskettes comprise a flexible magnetic disk which is enclosed in a jacket. The jacket has at least two openings therethrough. One of them is at the center on each side to enable the diskette to be engaged by a hub for rotating it, the other two are at opposite sides and comprise elliptic shaped openings which afford access for the reading head and for the pressure pad to opposite surfaces of a diskette. This invention provides doors which automatically cover the head and pressure pad access openings, except when a diskette is inserted into the reading mechanism at which time the door is automatically opened to enable the indicated access to the disk surfaces.

8 Claims, 7 Drawing Figures

DISKETTE DOOR

BACKGROUND OF THE INVENTION

This invention relates to magnetic recording media such as diskettes and more particularly to improvements therein.

In the course of handling diskettes, dirt as well as fingerprints reach the surface of a diskette through the access openings in the jacket provided for the magnetic heads. The finger prints reduce the amplitude of the signal which can be read from or recorded on this disk by providing an intervening media between the head and the disk surface. Dirt of the abrasive kind can cause head wear and/or surface scratches. All of this, of course, reduce the reliability of the diskette as well as its life.

Any system which can provide for automatically uncovering the access openings when a diskette is inserted in a reading and writing machine, or automatically covering these openings which requires extensive modifications to these mechanisms, or a moving mechanism thereon, would be undesirable from both a cost and complexity standpoint.

OBJECTS AND SUMMARY OF THE INVENTION

An object of this invention is the provision of an arrangement for automatically covering the head and pad access openings in a jacket when a diskette is not in a machine which is used to read or write on the diskette surfaces.

Another object is the provision of an arrangement for automatically uncovering head and pad access openings in a diskette when inserted in a machine used therewith and for covering said access openings when removed therefrom which requires only a minor modification without moving parts to said machine.

Still another object of this invention is the provision of a novel and useful method and means for protecting diskette surfaces against the adverse affects of handling.

The foregoing and other objects of the invention are achieved by providing a cover which is movable, with provisions so that when the diskette is inserted into the machine which serves to read or write thereon, a static pin in the machine serves to move a cover or door within the jacket to open the pad and head access openings. When the diskette is removed from the reading machine, the door is closed either by a static pin or by a spring to cover the pad and head access openings.

In another embodiment of the invention a sliding door on the jacket is used for covering the access openings when the diskette is not in the machine.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
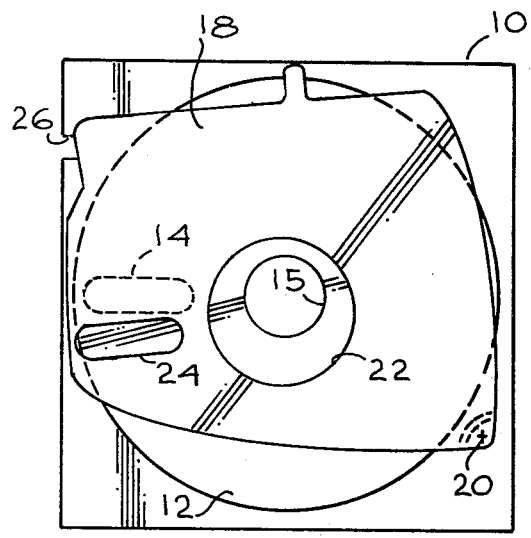
FIG. 1 illustrates a diskette with a door, in accordance with this invention, in a closed position.
Figure 2:
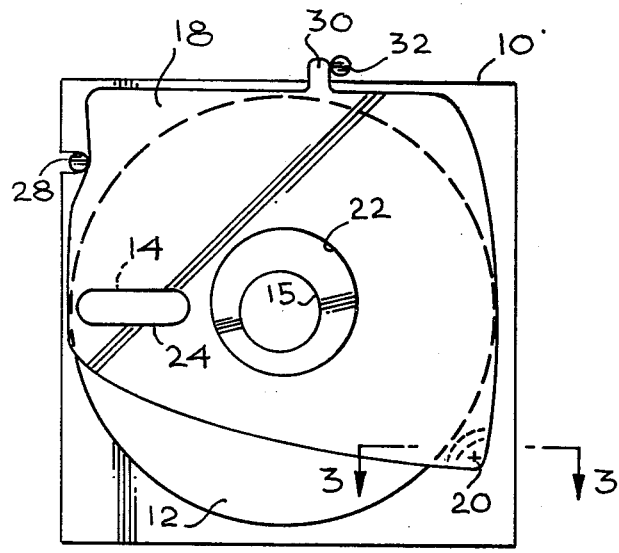
FIG. 2 illustrates a diskette, with a door, in accordance with this invention, in an open position.

FIGS. 1 and 2 represent a diskette with one-half of the jacket removed to better show a door in accordance with this invention. The jacket 10 encloses a magnetic disk 12. Both disk and jacket have a central opening 15. When the diskette is inserted into the apparatus which is used for writing and reproduction, a hub engages the central opening and rotates the magnetic disk. The jacket which encloses the disk has two openings, only one of which is represented by the dotted line 14. These are provided in order to enable the magnetic transducer head to have access to one surface and pressure pad to the opposite surface of the disk which is contained in the jacket. It is through these access openings that finger prints and dirt reach the disk surfaces.

In accordance with this invention, a means is provided for which covers the access openings 14 when the diskette is not in the machine, and the machine has provision for automatically uncovering these openings. In FIG. 1, a door member 18, shown also in FIG. 3, consists of two substantially identical members 18A, 18B both of which have a central opening 22, and an access opening 24. The surfaces of the members 18A, 18B which are adjacent to the disk are covered with the same linear material 19A, 19B, as is used for covering the inside surfaces of a jacket. This material is used for cleaning the surfaces of a disk. The central opening 22 is large enough to always leave the opening in the center of the disk 14 exposed, whether the door is in a position in which it covers the opening 14 or uncovers it. The jacket 10 has a notch 26 at one side whereby a pin 28, as shown in FIG. 2, can engage the side of the door members and pivot them unitl the opening 24 is over the opening 14 whereby access to the disk surfaces for the magnetic transducer heads is afforded. The pin 28 is mounted in the machine use for reading from and writing on the disk.

The door members 18 also have a tab 30 at one side whereby when the diskette is withdrawn from the machine used for reading and writing, another pin 32 mounted in the machine engages the tab and pushes it down until it is restored in the position shown in FIG. 1 where the openings 14 are covered. A slot in the edge of the jacket 10 is required to permit tab 30 to extend from the jacket. Thus by merely mounting two static pins in the reading and writing machine, the door in the jacket is positively moved to open and to close the door within the jacket.

Figure 3:
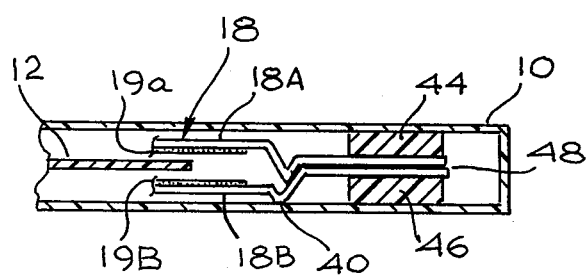
FIG. 3 is a cross sectional view taken along the lines 3—3 of FIG. 2 which shows a spring biased door.

Instead of using the pin 32 and tab 30, for closing, as shown in the cross sectional view in FIG. 3, a biased hinge otherwise known as flexural pivots 40, may be used so that when the diskette is extracted from the machine for writing and reproduction, the flexural pivots will return the door to a position at which the openings 14 will be covered. It should be noted that the door member 18 is held in place at the hinge between fixed members 44, 46. The assembly of the fixed members 44, 46 and the hinging end of the door member 48, may be bonded, riveted, stapled or welded to the jacket 10.

Figure 4:
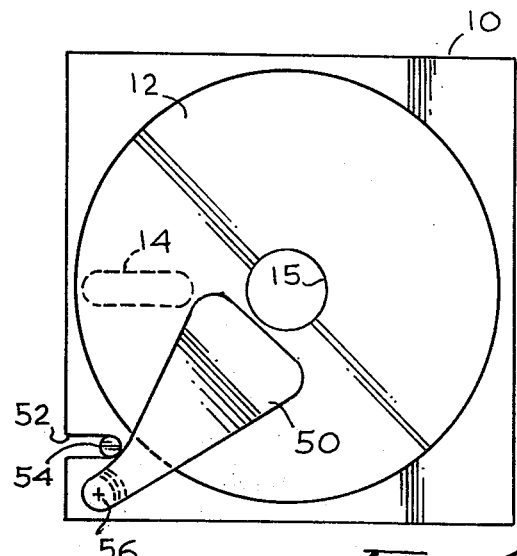
FIG. 4 is a drawing illustrating another embodiment of the invention.

FIG. 4 illustrates still another embodiment of the invention. Here, instead of the door members extending almost across the entire disk and including openings which are positioned in place when the diskette is inserted into the machine for reproduction and writing, a shorter door member 50, may be employed, which is pivotably hinged to the jacket at a location adjacent a notch 52 in the jacket which provides access for a pin 54 when the diskette is inserted into the machine for reproduction and writing. The member 50 does not have any openings therein. It extends from the hinging location 56 just far enough so that it will cover the openings 14. When it is withdrawn from the machine for writing and reproduction the flexural pivot points cause the member 50 to cover openings 14. The pin 54, serves to move the door member so that the openings 14 are uncovered when the diskette is inserted into the machine. It should be appreciated there that the appearance of the hinge, door members in cross section is the same as that shown in FIG. 3 except that the direction reversed. The door member 50 is also provided with a liner on the surfaces adjacent the disk for dirt removal.

For the purpose of positive closing, that is where reliance is not to be had on a spring, the pivot point for the door member should be at one or the other of the quadrants of the diskette furthest from the head and pad access openings.

Figure 5:
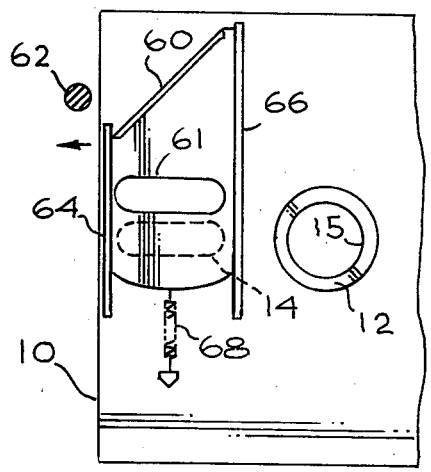
FIGS. 5 and 6 illustrate a door in a closed position and a door in an open position of still another embodiment of the invention.
Figure 6:
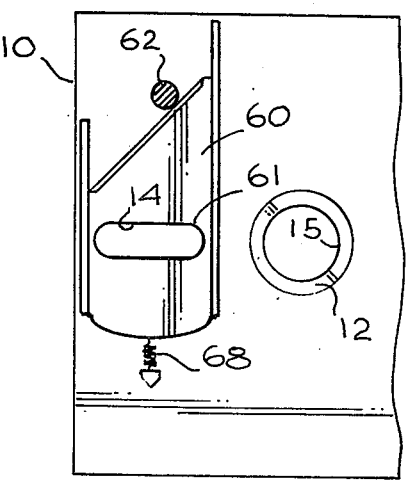

FIGS. 5 and 6 show still another embodiment of the invention. Here, the door members 60, are positioned on the outside of the jacket 10. FIG. 5 shows a door member in its closed position where the openings 14 are covered and FIG. 6 shows it in its open position with the opening 14 uncovered. The door members are on the outsides of the diskette jacket, one on each side. When the diskette is moved into the machine for reading and writing, pins 62 positioned in the machine, to be on opposite sides of the diskette, engage the door members 60 and move them downwardly until the opening 61 therein is superimposed over the opening 14. The door members slide between two spaced rails respectively 64, 66, which may be made of teflon to provide a minimum resistance. A spring 68 is compressed when the door member is pushed down by the pins 62 and when the diskette is removed from the machine for reading and writing then the spring restores the door members to the position at which the openings 14 are covered. No liner is required on the door member when it is on the outside of the jacket.

The embodiments of the invention shown in FIG. 1 through 4 are suitable for use with diskettes which are inserted only one way into the reading and writing mechanism, that is the diskette orientation upon insertion is always identical. There are diskettes which are reversible, to enable using both sides of the diskette for reading and writing. These are inverted when they are inserted into the mechanism for changing from one side to the other. That is, if one edge of a diskette parallel to the access openings is called the top edge and the other the bottom edge, for making a change from one side to the other the diskette is removed from the apparatus and flipped so that with reference to the apparatus, top and bottom edges are interchanged.

To convert the embodiments of the invention shown in FIGS. 1–4 to be usable for the two-sided diskette, in FIG. 2, the pins 28 and 32 would have to be duplicated at the same locations relative to the bottom edge of the diskette that they occupy relative to the top edge, as shown. However, some suitable spring biased mechanism must be used for retracting the two pins which would otherwise be in the way upon insertion of the diskette. A similar statement can be made for the placement of another pin, similar to pin 54 in FIG. 4, as well as the requirement for a pin retraction mechanism for the pin which would otherwise be in the way.

Figure 7:
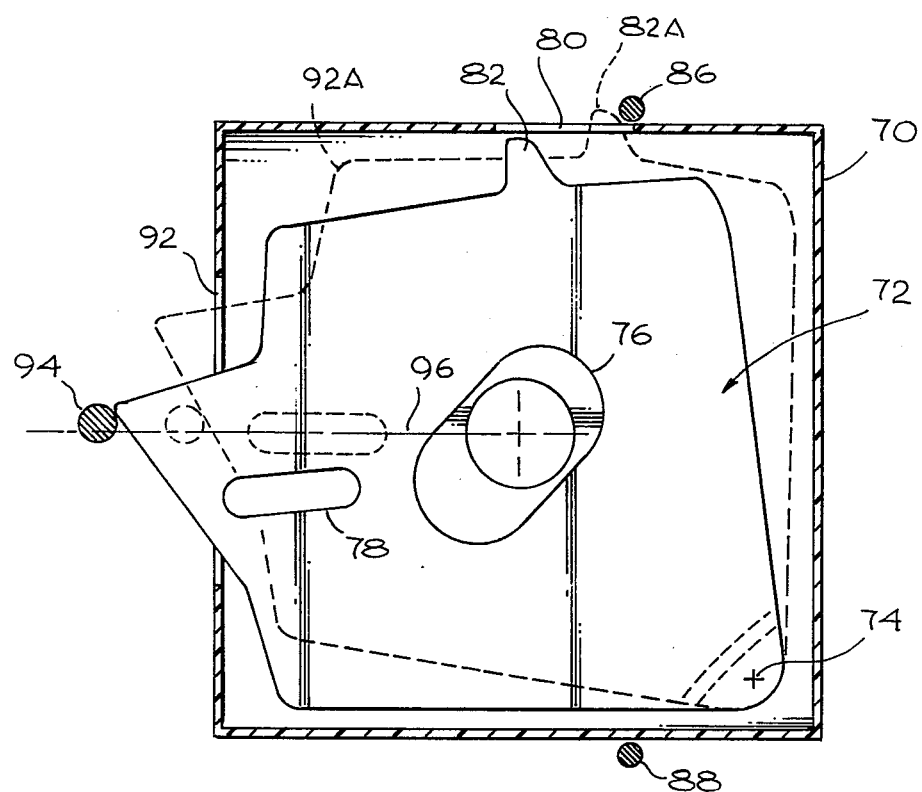
FIG. 7 illustrates the embodiment of the invention on a two-sided diskette.

FIG. 7 is an illustration of a door arrangement for a two-sided diskette which does not require a retraction mechanism for the pins. The pins required for operation are also shown. One half of the diskette envelope 70 is omitted to provide clarity in the drawing. A door 72 is pivotably supported at pivot point 74, in the same manner as shown in FIG. 3. The door, 72, has central openings, 76 similar to that shown in FIGS. 1 and 2 and for the same purpose. The envelope has a slot 80 at one side to permit a tab 82 to extend therethrough, as represented by dotted lines 82A when the diskette is inserted into the reading and writing apparatus.

Two fixed pins, respectively 86, 88 are located on either side of the diskette for the purpose of engaging the tab 82 and pivoting the door to the position where it covers the head axis openings in the envelope, when the diskette is withdrawn from the using apparatus. It will be appreciated that the reason two pins are required is because the disk may be inserted and withdrawn from the using apparatus with the tab at the location shown, or inverted and adjacent pin 88.

To take care of the problem of opening the door upon insertion into the using apparatus, the door has a substantially triangular extension, extending from the centerline of the door, with the top portion of the triangle extending out of the envelope through a slot 92 in the envelope. One side or the other of the triangular extension is engaged by a pin 94 which is positioned at one side of the centerline 96 which passes through the envelope when it is in position for insertion into the using apparatus. Upon insertion, pin 94 pivots door 92 upward to the location represented by the dotted lines 92A to align openings 78 with the head access openings. When the diskette is flipped, pin 94 would pivot the door downward to achieve the same purpose.

If desired, as shown in FIG. 3, a flexural hinge may be used at the pivot location and pins 86 and 88 as well as tab 82 may be omitted. As a result when the diskette is removed from the user apparatus the cover will automatically close the head access openings.

There has accordingly been shown and described hereinabove a novel and useful arrangement for protecting a diskette by covering the magnetic transducer head openings with a movable door when the diskette is not in use and opening the door with an arrangement which requires only a simple fixed addition to the machine with which diskettes are used.

What is claimed is:

1. A removeable diskette for use in conjunction with a diskette receiving magnetic storage equipment which has a magnetic transducer head, and which has operating means positioned to engage the diskette, comprising:

a magnetically coated disk;

a substantially rectangular jacket enclosing the disk, said jacket having an opening to afford access to a disk surface for the magnetic transducer head;

a door member movably positioned within said jacket beside said disk;

means pivotally mounting said door member in said jacket, to enable said member to pivot between first and second positions wherein said member respectively blocks and unblocks said jacket opening;

said door member including a tab portion positioned to directly engage said operating means and move said cover to said second position when the jacket is installed on the magnetic storage equipment.

2. The removeable diskette described in claim 1 wherein:
said jacket is slideably moveable into and out of said equipment; and
said door member includes a second portion which is moved into a position in the path of said operating means when said door is moved to said second position, so that said second portion engages said operating means when the jacket is moved out of the equipment, to restore said door member to said first position.

3. The diskette described in claim 1 wherein:
said door member is pivotally mounted at a first corner portion of the jacket which is formed by a pair of first perpendicular edges of the jacket, and said door extends across said disk with said door member portion which engages said operting means lying adjacent to an edge of said jacket which is opposite one of said edges of said first pair.

4. A removeable diskette for use in conjunction with a diskette-receiving magnetic storage equipment which has a magnetic transducer head and which has operating means positioned to engage the diskette, comprising:
a magnetically coated disk;
a jacket enclosing the disk, said jacket having an access opening to afford access to the disk surface for the magnetic transducer head;
cover means within said envelope for covering and uncovering said access opening;
means for pivotably supporting said cover means to be movable from a first position wherein said access opening is completely covered to a second position where said access opening is uncovered;
means for moving said cover means to said first position upon engagement with said operating means when said jacket is installed on the magnetic storage equipment, including a tab extending from one side of said cover means; and
means for moving said cover means to said second position upon engagement with said operating means when said jacket is moved out of the equipment, including a substantially pointed extension extending from another side of said cover means.

5. A removeable diskette for use in conjunction with a diskette-receiving magnetic storage equipment which has a magnetic transducer head and pressure pad, and which has a pair of pin means positioned to engage the diskette, comprising:
a magnetically coated disk;
a substantially rectangular jacket enclosing the disk, said jacket having access openings to afford access to the disk surfaces for the magnetic transducer head and pressure pad;
cover means within said jacket for covering and uncovering access openings;
means for pivotably supporting said cover means to be movable from a first position wherein said access openings are completely covered to a second position where said magnetic transducers means openings are uncovered;
said jacket having a first opening at a first edge thereof which is opposite to the location of said means for pivotably supporting said cover means, to provide access to said first pin means for moving said cover means from said first to said second position when said diskette is pushed against said pin means; and
a tab extending from an edge of said cover means and extending through a second jacket opening located along a second jacket edge which is perpendicular to said first edge to engage said second pin means and thereby move said cover means to said first position when said diskette is moved away from said first pin means.

6. A removeable diskette for use in conjunction with a diskette-receiving magnetic storage equipment which has a magnetic transducer head and pressure pad, and which has a pin means positioned to engage the diskette, comprising:
a magnetically coated disk;
a jacket enclosing the disk, said jacket having access openings to afford access to the disk surfaces for the magnetic transducer head and pressure pad;
cover means within said jacket for covering and uncovering access openings;
means for pivotably supporting said cover means to be movable from a first position wherein said access openings are completely covered to a second position where said magnetic transducer means openings are uncovered;
an extension-passing opening at a side of said jacket opposite to the location of said means for pivotably supporting said cover means;
said cover means having a substantially pointed extension extending from said cover means and through said extension-passing opening for engaging said pin means to pivot said cover means from said first position to said second position; and
means for moving said cover means from said second to said first position.

7. The diskette described in claim 6 wherein:
said equipment includes another pin means; and
said means for moving said cover means from said second position to said first position includes a tab extending from another side of said cover means and through another extension-passing opening in said jacket when said cover means is in said second position for engaging the second pin means to move said cover means to said first position when said diskette is moved away from said first pin means.

8. A removeable diskette for use in conjunction with magnetic storage equipment for slideably receiving a diskette, which has a magnetic transducer head, and which has first and second operating means position adjacent to first and second perpendicular edges of a diskette, comprising:
a magnetically coated disk;
a substantially rectangular jacket enclosing the disk, said jacket having an access opening in a face thereof to afford access to a disk surface for the magnetic transducer head, and having openings along first and second perpendicular edges of the jacket;
a door pivotally mounted within said jacket beside said disk, to pivot between first and second positions wherein said door respectively blocks and unblocks said access opening;
said door including a first portion lying near said first edge of said jacket, to be pressed by said first operating means to pivot said door to said first position when the jacket is installed on the magnetic storage equipment;
said door having a tab which lies near said second edge of said jacket and which protrudes from said second edge when said door is in said first position, to be engaged by said second operating means as the jacket is slid out of the equipment, to move said door to said second position.

* * * * *